(12) United States Patent
Smyth et al.

(10) Patent No.: US 11,436,349 B2
(45) Date of Patent: Sep. 6, 2022

(54) METHOD AND SYSTEM FOR IMPLEMENTING A CLOUD MACHINE LEARNING ENVIRONMENT

(71) Applicant: JPMorgan Chase Bank, N.A., New York, NY (US)

(72) Inventors: Brian J. Smyth, West Chester, PA (US); Mehul Jani, Edison, NJ (US); Kunjithapatham Muthuvelayutham, Towaco, NJ (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 551 days.

(21) Appl. No.: 16/678,012

(22) Filed: Nov. 8, 2019

(65) Prior Publication Data

US 2020/0151346 A1 May 14, 2020

Related U.S. Application Data

(60) Provisional application No. 62/757,948, filed on Nov. 9, 2018.

(51) Int. Cl.
*G06F 21/60* (2013.01)
*G06N 20/00* (2019.01)
*G06N 5/04* (2006.01)
*G06F 16/182* (2019.01)
*H04L 9/32* (2006.01)
*G06F 21/53* (2013.01)

(52) U.S. Cl.
CPC .......... *G06F 21/604* (2013.01); *G06F 16/182* (2019.01); *G06F 21/53* (2013.01); *G06F 21/602* (2013.01); *G06N 5/04* (2013.01); *G06N 20/00* (2019.01); *H04L 9/3236* (2013.01); *G06F 2221/033* (2013.01)

(58) Field of Classification Search
CPC .................................................. G06F 21/604
See application file for complete search history.

(56) References Cited

U.S. PATENT DOCUMENTS

2017/0104725 A1* 4/2017 Acharya ............... H04L 67/148
2019/0392176 A1* 12/2019 Taron ..................... G06F 3/167
2020/0005213 A1* 1/2020 Clemens ........ G06Q 10/063114

* cited by examiner

*Primary Examiner* — Simon P Kanaan
(74) *Attorney, Agent, or Firm* — Greenblum & Bernstein, P.L.C.

(57) ABSTRACT

An embodiment of the present invention is directed to leveraging GPU farms for machine learning where the selection of data is self-service. The data may be cleansed based on a classification and automatically transferred to a cloud services platform. This allows an entity to leverage the commoditization of the GPU farms in the public cloud without exposing data into that cloud. Also, an entire creation of a ML instance may be fully managed by a business analyst, data scientist and/or other users and teams.

20 Claims, 10 Drawing Sheets

SANDBOX SERVICES

Create Sandbox

Manage Sandboxes 610

Show [10] entries                                                                 Enter Key Word

| Name | Sandbox ID | Schema Name | RBAC Profile | AD Role | PG Role | Owners | Members | Created By | Created Time | Expiration Period | Status | Shared Type | Action |
|---|---|---|---|---|---|---|---|---|---|---|---|---|---|
| Sandbox Four... | 247 | | USR_RBAC... | | 2 | 0 | 0 | | Sep. 5, 2018... | 30/365 | | SHARED | ◇ ▽ |
| Test_Sandbox... | 243 | sb_1xxx5 | USR_RBAC... | GND... | 2 | 1 | 1 | | Sep. 5, 2018... | 30/365 | Created | SHARED | ◇ ▽ |
| Test_Sandbox... | 242 | | USR_RBAC... | | 2 | 0 | 0 | | Sep. 5, 2018... | 30/365 | | SHARED | ◇ ▽ |
| Test_Sandbox... | 240 | sb_1xxx5 | GNQ_USR... | | 3 | 0 | 0 | | Sep. 5, 2018... | 30/365 | Creation in Progress | SHARED | ◇ ▽ |
| AI_Shared... | 236 | sb_1xxx0 | USR_RBAC... | | 2 | 0 | 0 | | Aug 29, 2018... | 30/365 | Creation Failed | SHARED | ◇ ▽ |
| AI Personal... | 187 | sb_r5xx1 | | | 0 | 1 | 1 | | Jul 31, 2018... | 30/365 | Created | PERSONAL | ◇ ▽ |
| AI Test... | 183 | sb_1xxx0 | USR_RBAC... | GNP... | 2 | 1 | 1 | | Jul 31, 2018... | 30/365 | Created | SHARED | ◇ ▽ |

Showing 1 to 7 of 7 entries                                                    First  (1)  Last

Figure 6

SANDBOX SERVICES

710

| Sandbox Name | Test_Sandbox_Three |
|---|---|
| Schema Name | sb_1xxx5 |
| Sandbox Type | SHARED |

712

| Objects Count | 3 |
|---|---|
| Sandbox Status | Active |
| Sandbox Members Count | 1 |

714

| Created By | |
|---|---|
| Sandbox Owner(s) | |
| Sandbox Owners Count | 1 |

Create Hive Table 716

Manage Objects 710

Show 18 entries     Enter Key Word

| Object Name | Object Type | Schema Name | Created On | Created By | Owner | Object Status | PG Status | Share Mode | Expiration Day(s) | Action |
|---|---|---|---|---|---|---|---|---|---|---|
| test_three | HIVE | sb_1xxx5 | Sep. 7, 2018... | | | Created | PG-UNCLASSIFIED | | 361 | ⟲ |
| goodbye | HIVE | sb_1xxx5 | Sep. 5, 2018... | | | Created | PG-UNCLASSIFIED | | 359 | ⟲ |
| hello_t | HIVE | sb_1xxx5 | Sep. 5, 2018... | | | Created | PG-UNCLASSIFIED | | 359 | ⟲ |

Showing 1 to 3 of 3 entries     First (1) Last

Figure 7

Create Sandbox 810

Platform Type* 812
HADOOP_DISCOVERY

Sandbox Type* ◯ Shared 814
Sandbox Name* 816
Test_Risk-Sandbox

Purpose* 818
To Test Risk Data in Lower Enviornments

RBAC RSAM Profile 820
○ GNQ_USR-RBAC-Dxx-TRAINING-ONE
○ GNQ_USR-RBAC-Dxx-TRAINING-TWO
● USR_RBAC_CCB_RISK_FRCST
○ GNQ_USR-RBAC-FCD_CARD_A
○ GNQ_USR-RBAC-FCD_DATA_A
○ GNQ_USR-RBAC-xxRISK_DATA_STRATEGY
○ GNQ_USR-RBAC-CCBxxT_CCA_Txxx
○ GNQ_USR-RBAC-RISK_FRAUD_ANALYST Protection Group Rates 822
CCB_PxxC_GRP_CxxD
CCB_PxxC_GRP_IxxL RBAC RSAM Profile 824

Approvers 826
| x | x | x | Approver SID |

[ Next ]  [ Close ]

Figure 8

Create Hive Table 910

Schema Name* 912 sb-1xxx5

Table Name* 914 sp_historical_close_prices_t

Description* 916

Close Prices for S&P 500

Columns 918

| Position | Field Name | Data Type | Length | Precision | Scale | Action |
|---|---|---|---|---|---|---|
| 1 | rpt_date | DATE | | | | |
| 2 | rpt_open | FLOAT | | | | |
| 3 | rpt_high | FLOAT | | | | |
| 4 | rpt_low | FLOAT | | | | |
| 5 | rpt_close | FLOAT | | | | |

+ Add New Field

Options

File Format* 920

ORC
SEQUENCEFILE
TEXTFILE
RCFILE
ORC
PARQUET
AVRO
JSONFILE
INPUTFORMAT ( Submit )  ( Cancel )

Figure 9

Protection Group Classification 1010

Allowed Protection Groups for this sandbox: CNFD, INTL    1012

| Attribute | Data Type | PG Code | PG Name |
|---|---|---|---|
| rpt_date | DATE | | |
| rpt_open | FLOAT | | |
| rpt_high | FLOAT | | |
| rpt_low | FLOAT | | |
| rpt_date | FLOAT | | |
| rpt_close | FLOAT | | |
| rpt_adjclose | FLOAT | | |
| rpt_volume | FLOAT | | |

Submit    Close

Figure 10

METHOD AND SYSTEM FOR IMPLEMENTING A CLOUD MACHINE LEARNING ENVIRONMENT

CROSS REFERENCE TO RELATED APPLICATIONS

The application claims priority to U.S. Provisional Application 62/757,948, filed Nov. 9, 2018, the contents of which are incorporated herein in its entirety.

FIELD OF THE INVENTION

The invention relates generally to a system and method for implementing a cloud machine learning environment.

BACKGROUND OF THE INVENTION

Currently, entities are required to leverage Graphics Processing Unit (GPU) farms or clusters to properly perform machine learning (ML) activities. These are non-commodity devices whose sole purpose is to perform ML. Accordingly, to create any ML activities, a significant amount of effort including IT resources are required to setup and plan.

These and other drawbacks exist.

SUMMARY OF THE INVENTION

According to one embodiment, the invention relates to a system for implementing a self-service, auto prep and cleanse cloud machine learning environment. The system comprises: a data source interface that communicates with a plurality of data sources; an interactive interface that communicates with a user via a network communication; and a processor coupled to the memory component and the interactive interface, the processor configured to perform the steps of: receiving, via a discovery portal, a user request that identifies a data set; performing data provisioning that accesses the data set from one or more internal data sources; creating a machine learning instance in a cloud services platform; transferring the data set from the one or more internal data sources to a cloud data storage associated with the cloud services platform; cleansing the data set during the transferring step; and applying machine learning analytics to the transferred dataset in the cloud data storage.

The computer implemented system and method described herein provide unique advantages to entities, organizations and other users, according to various embodiments of the invention. An embodiment of the present invention is directed to enhancing data integrity and preserving confidentiality of data in a manner that is useable for machine learning and other applications. The innovative system and method facilitates machine learning activities and tasks by enabling users to make requests via a self-service portal. Accordingly, a system and method of an embodiment of the present invention provides improved utilization, resource efficiencies and substantial cost savings. These and other advantages will be described more fully in the following detailed description.

BRIEF DESCRIPTION OF THE DRAWINGS

In order to facilitate a fuller understanding of the present invention, reference is now made to the attached drawings. The drawings should not be construed as limiting the present invention, but are intended only to illustrate different aspects and embodiments of the invention.

FIG. 6 illustrates Sandbox details, according to an embodiment of the present invention.

FIG. 7 illustrates Objects interface, according to an embodiment of the present invention.

FIG. 8 illustrates a Create New Sandbox interface, according to an embodiment of the present invention.

FIG. 9 illustrates a Create a New Hive/Impala Table interface, according to an embodiment of the present invention.

FIG. 10 illustrates a PG Classification interface, according to an embodiment of the present invention.

DETAILED DESCRIPTION OF THE PREFERRED EMBODIMENT(S)

The following description is intended to convey an understanding of the present invention by providing specific embodiments and details. It is understood, however, that the present invention is not limited to these specific embodiments and details, which are exemplary only. It is further understood that one possessing ordinary skill in the art, in light of known systems and methods, would appreciate the use of the invention for its intended purposes and benefits in any number of alternative embodiments, depending upon specific design and other needs.

Large scale cloud companies have created machine learning (ML) GPU farms on a per-use basis. An embodiment of the present invention is directed to leveraging these farms for machine learning with the additional requirement that the selection of data is self-service. With an embodiment of the present invention, data may be classified to properly protect sensitive and confidential data and also pre-cleansed based on the classification. The data may then be auto-transmitted to a cloud services platform. This allows an entity to leverage the commoditization of the GPU farms in the public cloud without exposing and compromising the data to the cloud. Also, an entire creation of a ML instance may be fully managed by a business analyst, data scientist and/or other user.

An embodiment of the present invention is directed to implementing discovery zones in a big data platform that support deep analytics and machine learning techniques. For example, customer data may be evaluated to provide better experiences for a specific customer. This process may involve analyzing sensitive customer data that needs to be protected, according to regulations and other standards. An embodiment of the present invention leverages a cloud services platform in a manner that preserves confidentiality of sensitive customer personally identifiable information (PII). An embodiment of the present invention may apply rules based on categorizations that define how to treat and/or protect the data.

For example, a user may select data to be moved into a discovery zone. By initiating this transfer, an embodiment of the present invention may create and/or apply rules on how to treat the data. This may involve how to maintain confidentiality and data integrity where highly confidential data (e.g., social security number) may be encrypted, tokenized and/or otherwise protected. In this example, when machine learning techniques are applied to the data, the confidentiality of the data may be preserved, e.g., social security number is not discoverable. And, in many instances, the actual social security number is not essential to the analysis, action or task.

Figure 1:
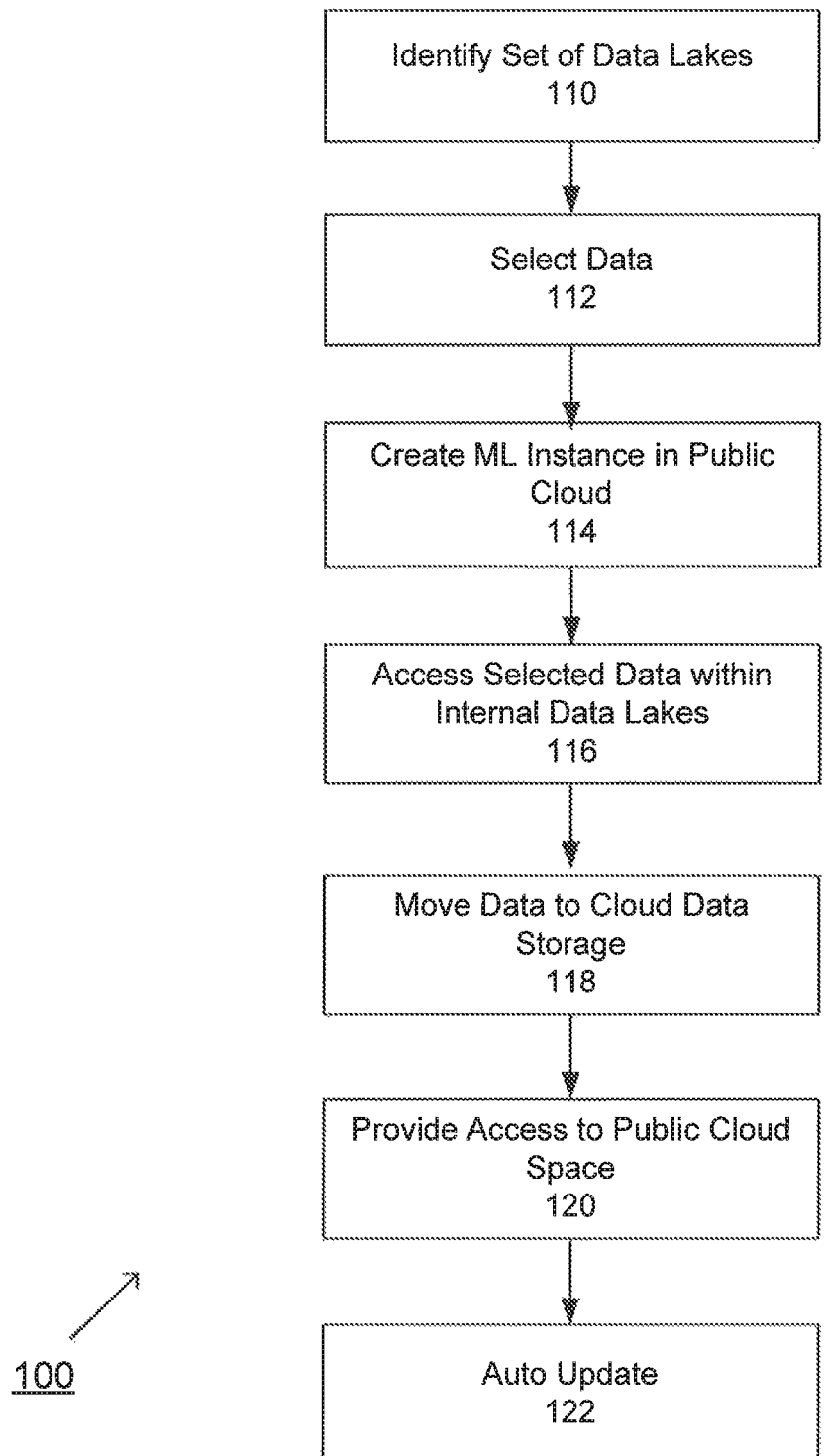
FIG. 1 is an exemplary flowchart for implementing a cloud machine learning environment, according to an embodiment of the present invention.

FIG. 1 is an exemplary flowchart for implementing a cloud machine learning environment, according to an embodiment of the present invention. At step 110, a set of data lakes may be identified. At step 112, data may be selected from a catalog. At step 114, a user may create a Machine Learning (ML) instance in a public cloud. At step 116, the selected data may be accessed within internal data lakes. At step 118, the data may be moved from the internal lakes to a cloud data storage. At step 120, once data is moved, the user may be given access to the public cloud space. At step 122, an auto update may be performed. The order illustrated in FIG. 1 is merely exemplary. While the process of FIG. 1 illustrates certain steps performed in a particular order, it should be understood that the embodiments of the present invention may be practiced by adding one or more steps to the processes, omitting steps within the processes and/or altering the order in which one or more steps are performed. The steps will be described in more detail below.

At step 110, a set of data lakes may be identified. For example, a large set of data lakes with a data catalog that understands the data types, classification (e.g., security level, etc.) and where the data is located may be provided.

At step 112, data may be selected from a catalog. Data may be selected from other sources of data as well.

At step 114, a user may create a ML instance in a public cloud. The public cloud may include components, services and functionality related to machine learning, sandboxes, data transformation, consumption, logging, monitoring, etc. Machine learning services may provide building, training and deployment of machine learning models. Sandboxes may include storage services, e.g., object storage services, block storage, file systems, etc. Data transformation may include big data processing and analysis, such as processing unstructured data in parallel across distributed clusters of processors or computers. Data consumption may include interactive queries services, data warehouse services, NoSQL database services, and business analytics services. Logging and monitoring may include monitoring and management services.

At step 116, the selected data may be accessed within internal data lakes. Other internal sources may be accessed.

At step 118, the data may be moved from the internal lakes to a cloud data storage. While moving the data, the data may be cleansed for protection based on classification rules. For example, cleansing may be in the form of: one way hash encryption, two way keyed encryption, data conversion and/or left in clear text. Other security features may be applied. In addition, before cleansing, an embodiment of the present invention may run or execute an analysis on a portion of the data to avoid misclassifications and/or other errors.

At step 120, once data is moved, the user may be given access to the public cloud space for performing actions, such as analytics and other tasks.

At step 122, an auto update may be performed. This may be performed to maintain current and relevant data. For example, on a regular cadence (e.g., real-time, hourly, nightly, weekly, etc.), an auto-update on the cloud data may be performed with new data from the internal data lakes. The auto-update may involve performing the auto-cleansing.

Figure 2:
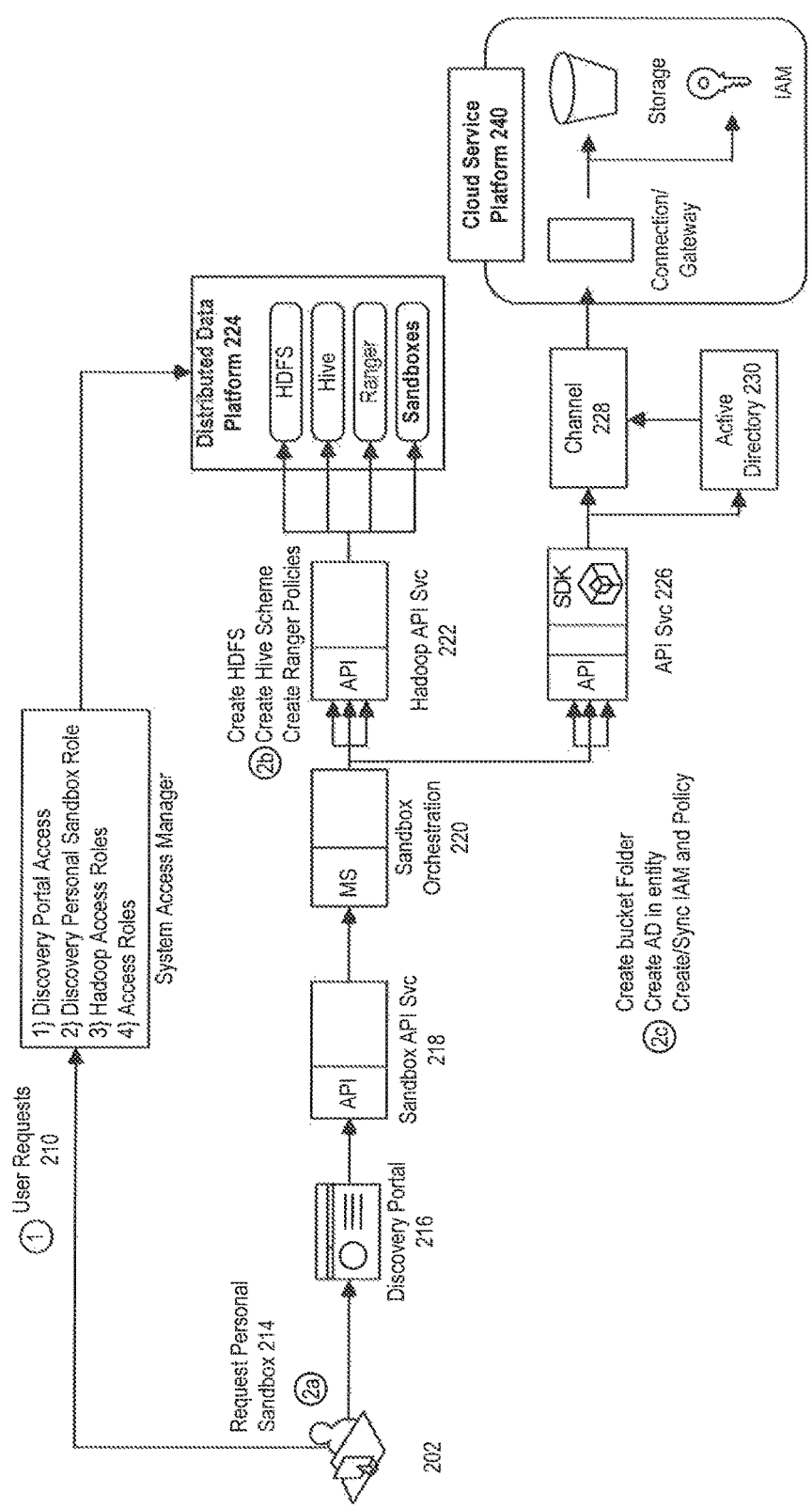
FIG. 2 is an exemplary system diagram of sandbox creation, according to an embodiment of the present invention.

FIG. 2 is an exemplary system diagram of sandbox creation, according to an embodiment of the present invention. An embodiment of the present invention enables data scientists (and other users) to merge data from multiple sources for analysis and machine learning in cloud services platform in a secure way. Data may be provisioned to a cloud services platform from Unified Data Services (UDS), other Consumer and Community Banking (CCB) data sources, user provided data (UPD), etc. An embodiment of the present invention further facilitates use of machine learning applications and frameworks, including SageMaker, TensorFlow, MxNet, Athena, EMR, QuickSight, Redshift, Glue, etc. Moreover, the data is secure in a public cloud platform.

As shown in FIG. 2, User 202 may submit a request at 210, which may include discovery portal access, discovery personal and/or shared sandbox roles, Hadoop access roles, object storage access roles, etc., as shown by 212. System Access Manager may facilitate the request, approval, fulfillment (e.g., automated and manual) and processes of access to resources, such as database, active-directory groups, LDAP groups, server access, etc. A user may also request a personal sandbox (at 214) or a shared sandbox and further create Hadoop Distributed File System (HDFS), Hive/Impala Schemas, Hive/Impala Tables, Ranger or Cloud-platform specific access Policies, etc., as represented by 222 and 224. As shown in FIG. 2, User 202 may access Discovery Portal 216 to request a personal sandbox. Discovery Portal 216 may access Sandbox Application Program Interface (API) 218 and Sandbox Orchestration 220. MS represents a messaging service or it may be an API. From Sandbox Orchestration 220, API for cloud services may be initiated at 222 (e.g., Hadoop API) and/or at 226 (e.g., Cloud Services API). Hadoop API 222 may access a set of tools represented by Distributed Data Platform 224. Hadoop API 222 may create HDFS, Hive Schema, Ranger Policies, etc. Cloud Services API 226 may enable a user to create a bucket folder and perform other actions in a cloud services platform. Through Channel 228 and Active Directory 230, Cloud Services Platform 240 may be accessed. Cloud Services Platform 240 may include Connection/Gateway, Storage and Identify and Access Management (IAM) components and services. Active Directory may represent a directory service that authenticates and authorizes users and computers in a domain type network by assigning and enforcing security policies. Other directory services may be supported.

Access Control may include user authentication and authorization as well as controlled access to data. User authentication and authorization may involve leveraging Single Sign-On (SSO) and Active Directory, integration with an entity's directory, audit availability via cloud services. With controlled access to data, each sandbox may have active directory groups and corresponding cloud services user groups. A user may request membership with approvals workflow. Further, each sandbox and/or object may have permission policies associated with an active directory groups or End User's Unique Identifier or SID (Standard Identifier). Depending on the use case, data and collaboration, personal sandbox and/or shared sandbox may be used. Audit features are also available via cloud services.

Figure 3:
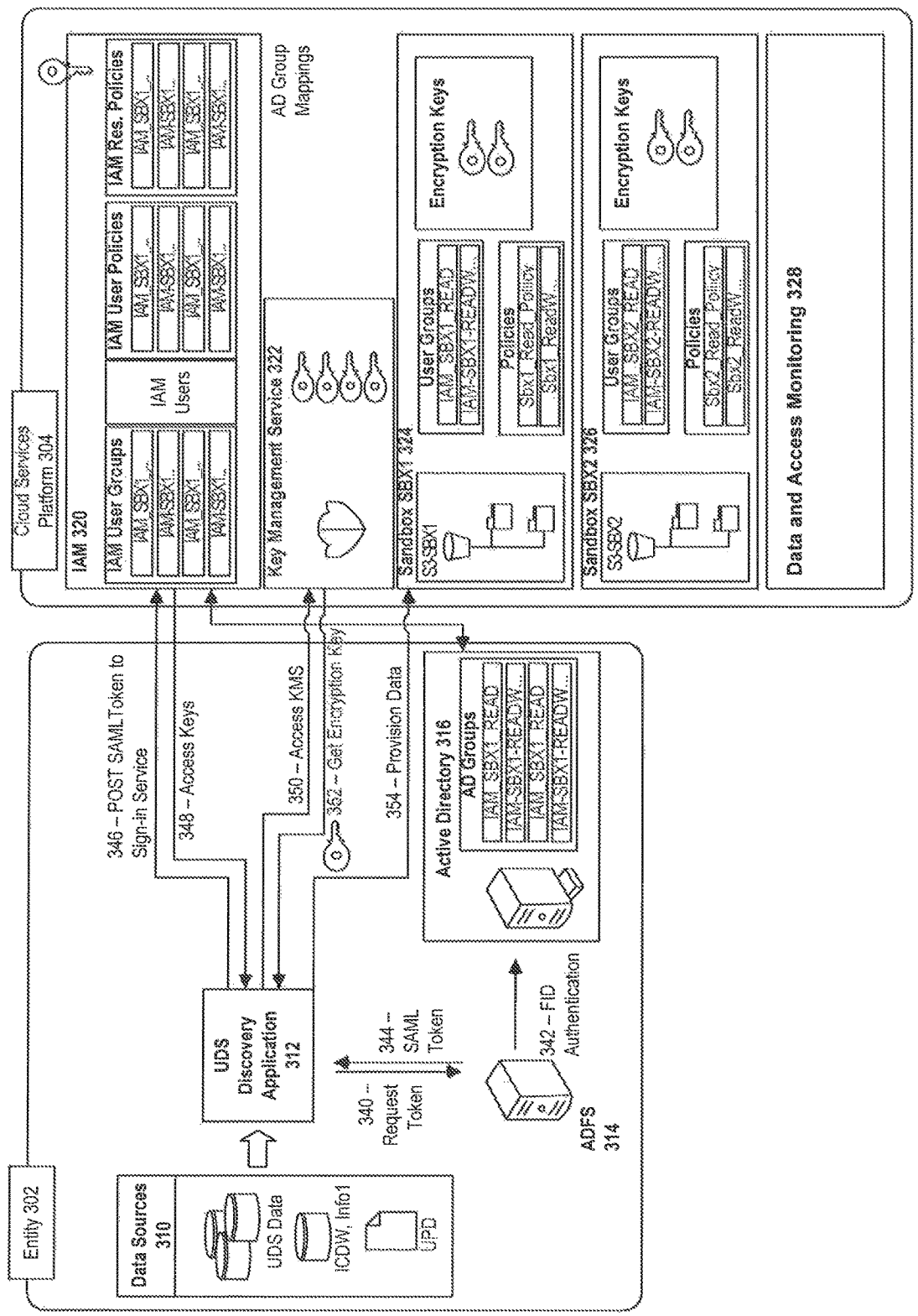
FIG. 3 is an exemplary system diagram of a discovery application access, according to an embodiment of the present invention.

FIG. 3 is an exemplary system diagram of a discovery application access, according to an embodiment of the present invention. FIG. 3 illustrates the interaction between an Entity 302 and a Cloud Services Platform 304. Entity 302 may include Data Sources 310, Unified Data Services (UDS) Discovery Application 312, Active Directory Federation Services (ADFS) 314 and Active Directory 316. Other signal sign-on and directory services solutions and tools may be supported. Cloud Services Platform 304 may include Identify and Access Management (IAM) 320, Key Management Services (KMS) 322, Sandbox 324, Sandbox 326 and Data and Access Monitoring 328. Data Sources 310 may include UDS Data, user provided data, etc.

As shown by FIG. 3, UDS Discovery Application 312 may request a token from ADFS 314 via 340. ADFS 314 may request Federated Identity (FID) Authentication from Active Directory 316 via 342. Other authentications may be performed. ADFS 314 may then forward Security Assertion Markup Language (SAML) token to UDS Discovery Application 312, via 344. SAML is one example; other languages and security standards may be applied. As shown by 346, UDS Discovery Application 312 may post the SAML token to a Sign-in Service via IAM 320. IAM 320 may forward Access Keys via 348. UDS Discovery Application 312 may then forward Access KMS to Key Management Service 322 via 350. Key management service 322 may get encryption keys from UDS Discovery Application 312 via 352. UDS Discovery Application 312 may provision data to Sandbox 324 via 354.

IAM 320 may support IAM User Groups, IAM Users, IAM User Policies, IAM Resources Policies. IAM may be linked with Active Directory.

Sandbox 324, 326 may include Buckets or Base Folders, User Groups and Encryption Keys. For example, each Sandbox may have an associated User groups which may be linked with Corporate AD Groups. Each Sandbox may have corresponding policies and permissions which give access to a single sandbox only. Each Sandbox and Objects may have corresponding encryption keys. Data and Access Monitoring functions and features may be provided by 328.

Figure 4:
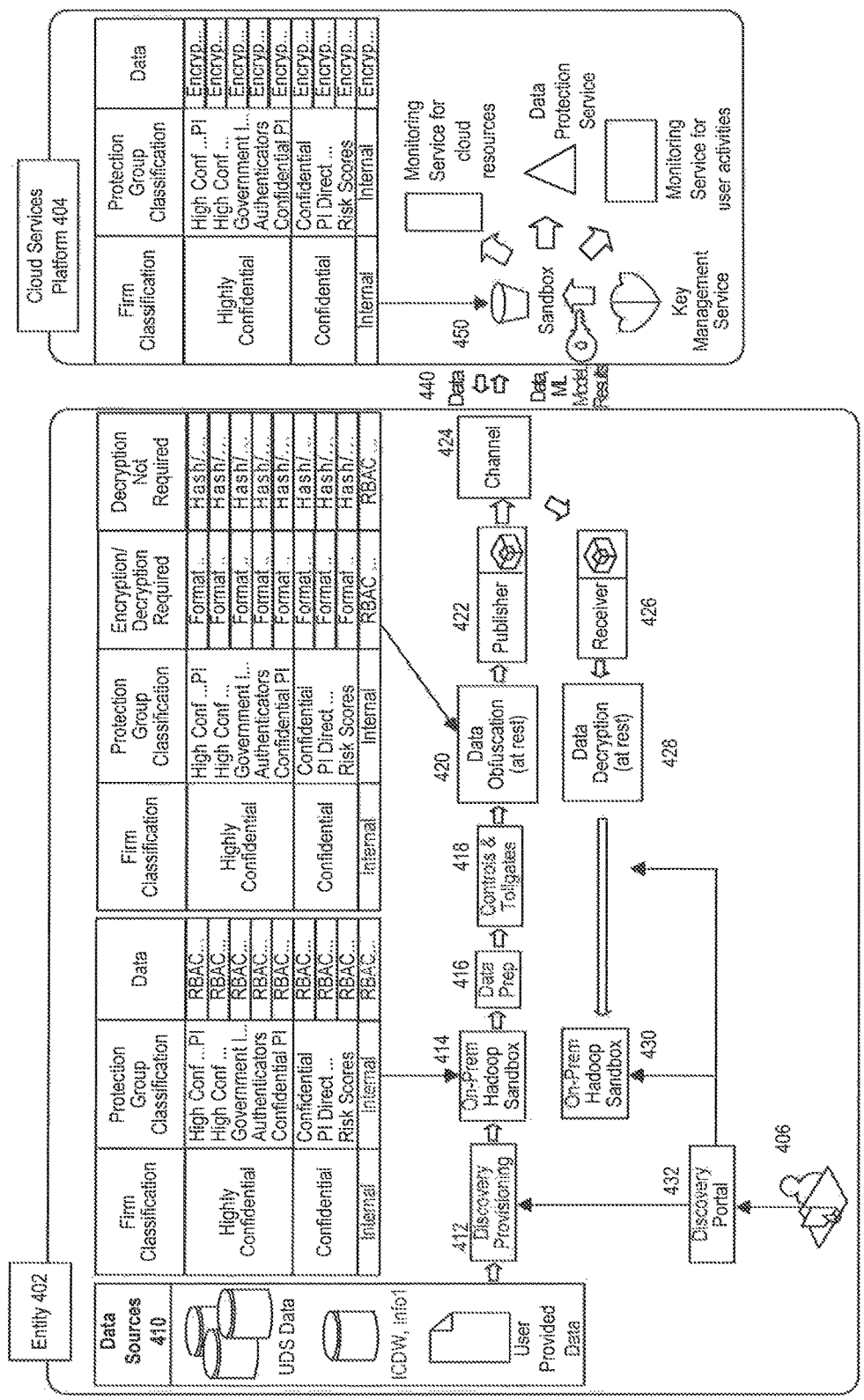
FIG. 4 is an exemplary system diagram of data provisioning to a cloud service, according to an embodiment of the present invention.

FIG. 4 is an exemplary system diagram of data provisioning to a cloud service, according to an embodiment of the present invention. FIG. 4 illustrates the interaction between an Entity 402 and a Cloud Services Platform 404. As shown in FIG. 4, the process may include Discovery Provisioning 412, On-Premise Hadoop Sandbox 414, Data Preparation 416, Controls and Tollgates 418, Data Obfuscation (at rest) 420, Publisher 422, Channel 424, Receiver 426, Data Decryption (at rest) 428 and On-Premise Hadoop Sandbox 430.

FIG. 4 further illustrates moving machine learning models back to Unified Data Services (UDS). As shown in FIG. 4, data sources 410 are represented as UDS data, data warehouses and user provided data (UPD). Discovery provisioning 412 may be requested via a Discovery Portal 432 accessed by User 406. During discovery provisioning, a user may specify data or sets of data. Through Discovery Portal 432, users may select data set(s) or a load user provided data (UPD) function. Users may also define data selection criteria; identify Protection Group (PG) Classification for UPD as well as select target platform (e.g., Hadoop, AWS, other cloud platforms, etc.). Hadoop sandboxes may be created. The data is then prepped which may involve categorization and applying a level of protection at 416. Controls and Tollgates may be applied at 418. Data Obfuscation may be applied to protect the data at 420.

On-Premise Hadoop Sandbox 414 may access data relating to Firm Classification, Protection Group Classification and Data. For example, Firm Classification may include level of confidentiality, e.g., Highly Confidential, Confidential, Internal, etc. Protection Group Classification for Highly Confidential may include High Confidential PI, High Confidential, Government Identifiers, Authenticators, Confidential PI, etc. Protection Group Classification for Confidential may include Confidential, PI Direct Identifiers, Risk Scores, etc. Data may be role based access control (RBAC).

Data Obfuscation (at rest) 420 may access data relating to Firm Classification, Protection Group Classification, Encryption/Decryption Required, Decryption NOT Required. Encryption/Decryption Required may indicate whether encryption or decryption is required and what type. For example, this may include Format Preserving Encryption. Decryption NOT Required may indicate whether decryption is required or not and what type. This may include Hash, Mask, Tokens, RBAC Based, etc.

Publisher 422 may publish data through Channel 424. For example, data from Cloud Services Platform 404 may be received by Entity 402, via 440. In addition, Entity 402 may exchange data, ML models and results with Cloud Services Platform 404, via 440. Receiver 426 may use cloud platform SDK/APIs. Receiver 426 may also receive model, results back from Cloud Platform.

Data Decryption (at rest) 428 may be based on PG Classification, PII Indicators, ML Use Cases, Technology Control/Risk Officer (TCO) Recommendations. Algorithm Alternatives may include symmetric encryption, format preserving, one-way hash, tokens, masking, etc. Software Alternatives may include Dephix, Voltage, Custom built, etc.

On-Premise Hadoop Sandbox 430 may provide staging before promoting to cloud platform, on-premise analysis, build and train ML models, save ML models, receive results from cloud platform, etc.

Entity 402 may communicate with Cloud Services Platform 404 through channel 424 where data, ML models and results may be exchanged. Cloud Services Platform 404 may include Sandbox 450. Sandbox 450 may communicate with Monitoring Services for cloud resources, Data Protection Services, Monitoring Services for user activities and Key Management Service. Monitoring Services for cloud resources may collect and track metrics; collect and monitor log files and set alarms. Monitoring Services for user activities may monitor user activities and API usage. Data Protection Services may automatically discover, classify and protect sensitive data and further provide data visibility and alerting.

Sandbox 450 may access data relating to Firm Classification, Protection Group Classification and Data. For example, Firm Classification may include level of confidentiality, e.g., Highly Confidential, Confidential, Internal, etc. Protection Group Classification for Highly Confidential may include High Confidential PI, High Confidential, Government Identifiers, Authenticators, Confidential PI, etc. Protection Group Classification for Confidential may include Confidential, PI Direct Identifiers, Risk Scores, etc. Data may include data encrypted with Keys.

Figure 5:
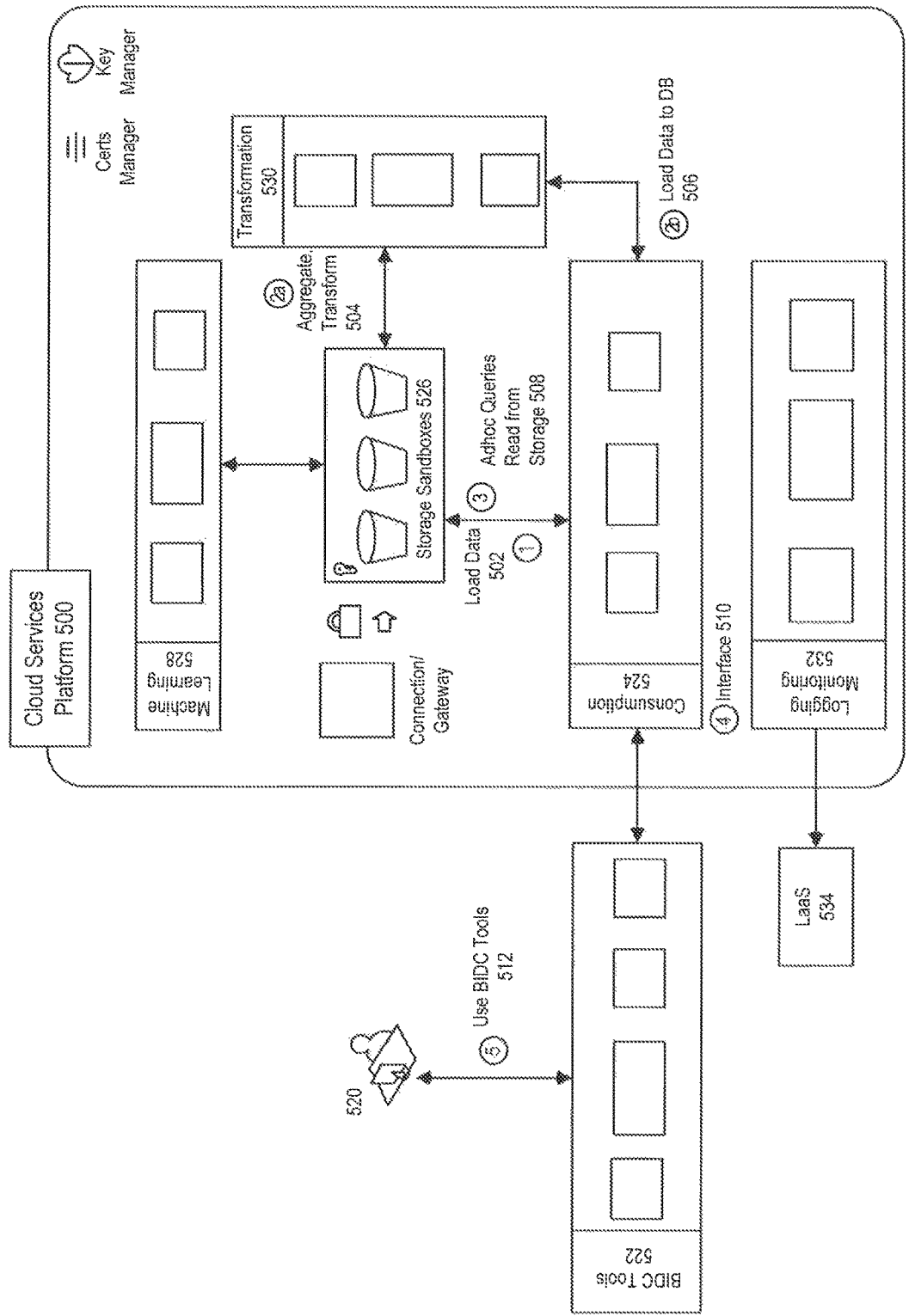
FIG. 5 is an exemplary system diagram of cloud services and consumption, according to an embodiment of the present invention.

FIG. 5 is an exemplary system diagram of cloud services and consumption, according to an embodiment of the present invention. Cloud Services Platform 500 may include components and services represented by Machine Learning 528, Sandboxes 526, Transformation 530, Consumption 524 and Logging Monitoring 532. Machine Learning 528 may represent services that enable users to build, train and deploy machine learning models. Sandboxes 526 may represent storage services including object storage services. Transformation 530 may represent big data processing and analysis tools that process massive amounts of unstructured data in parallel across distributed clusters of processors or computers. Consumption 524 may represent services to perform interactive queries as well as manage data warehouse services, NoSQL database services, and business analytics services. Logging Monitoring 532 may represent monitoring and management services as well as governance, compliance, operational auditing and risk auditing services. Other services may include enterprise security platforms and services including capturing, indexing and correlating real-time data.

As shown in FIG. 5, data may be loaded to Sandboxes at 502. Data may be aggregated and transformed at 530 via 504. Data may be loaded to databases via 506. Queries may be read from Sandboxes via 508. Other data consumption functions may be supported at 524. Logging and Monitoring functions 532 may be performed via interfaces at 510, which may be forwarded to Logging as a Service (LaaS) 534. Business Intelligence Delivery Center (BIDC) or Business Intelligence Tools represented by 522 may be used to access data via 512 by User 520.

The Figures refer to a particular cloud services platform for illustration purposes. Other cloud services platforms may be implemented in accordance with the various embodiments of the present invention.

FIGS. 6-10 represent exemplary user interfaces, according to an embodiment of the present invention. FIGS. 6-10 may represent exemplary interfaces for a Discovery Portal.

FIG. 6 illustrates Sandbox details, according to an embodiment of the present invention. A user may navigate to actions available for each Sandbox, such as Attest, Manage Objects and Drop. FIG. 6 illustrates a Manage Sandboxes interface 610. Users may create sandboxes and view and manage existing sandboxes. Information may include Name, Sandbox Identifier, Schema Name, RBAC Profile, AD Role, PG Role, Owners, Members, Created By, Created Time, Expiration Period, Status, Shared Type, and Action. Status may include Created, Creation in Progress, Failed, etc.

FIG. 7 illustrates Objects interface, according to an embodiment of the present invention. FIG. 7 illustrates details for objects in a current Sandbox. A user may navigate to actions available for a given object, such as Drop, Protection Group (PG) Classify and Share. FIG. 7 illustrates a Manage Objects interface 710. The Interface may provide summary information as shown by Sandbox Name, Schema Name, Sandbox Type at 710; Objects Count, Sandbox Status and Sandbox Members Count at 712; and Created by, Sandbox Owner(s) and Sandbox Owners Count at 714. Users may create Hive tables and view and manage existing objects at 716. Object information may include Object Name, Object Type, Schema Name, Created On, Created By, Owner, Object Status, PG Status, Share Mode, Expiration (Days), Action.

Through the interface of FIG. 7, a user may share objects. After a Hive/Impala table has been PG Classified, the Object's status may be listed as PG-CLASSIFIED. Under Actions, a user may choose Share, e.g., Share Read Only, Share Read/Write, etc.

FIG. 8 illustrates a Create New Sandbox interface, according to an embodiment of the present invention. FIG. 8 illustrates a Create Sandbox interface 810. As shown by FIG. 8, a user may identify Platform Type 812, Sandbox Type 814, Sandbox Name 816, Purpose 818, Profile data 820, Protection Group Roles 822, Profile Members 824 and Approvers 826.

FIG. 9 illustrates a Create a New Hive/Impala Table interface, according to an embodiment of the present invention. FIG. 9 illustrates a Create Hive Table interface 910. Other types of tables and data structures may be created. As shown by FIG. 9, a user may identify Schema Name 912, Table Name 914 and Description 916. Column data may include position, field name, data type, length, precision, scale, and action, as shown by 918. Data type may include Date, Float, etc. Other options may include File Format, which may include Sequence File, Text File, RC File, ORC, Parquet, Avro, JSON file and Input Format, as shown by 920.

FIG. 10 illustrates a PG Classification interface, according to an embodiment of the present invention. FIG. 10 illustrates a Protection Group Classification interface 1010. Users may identify what protection groups are allowed in a sandbox. FIG. 10 indicates that protection groups CNFD and INTL are allowed as shown by 1012. Details may include Attribute, Data Type, PG Code and PG Name. Notifications may be provided, including warning. For example, a PG Code that is not within the allowed protection groups may be highlighted. If there are any warnings, they may be displayed in red, for example. This indicates that a PG Classification is out-of-bounds for the PG Codes defined for this Sandbox.

The various features of an embodiment of the present invention may be applied to other applications, uses and scenarios. For example, an embodiment of the present invention may be applied to procurement decisions and other hardware, configuration and infrastructure decisions. An embodiment of the present invention may be applied to identify underlying trends and patterns to address various automation incompatibilities and other issues.

The foregoing examples show the various embodiments of the invention in one physical configuration; however, it is to be appreciated that the various components may be located at distant portions of a distributed network, such as a local area network, a wide area network, a telecommunications network, an intranet and/or the Internet. Thus, it should be appreciated that the components of the various embodiments may be combined into one or more devices, collocated on a particular node of a distributed network, or distributed at various locations in a network, for example. As will be appreciated by those skilled in the art, the components of the various embodiments may be arranged at any location or locations within a distributed network without affecting the operation of the respective system.

As described above, the various embodiments of the present invention support a number of communication devices and components, each of which may include at least one programmed processor and at least one memory or storage device. The memory may store a set of instructions. The instructions may be either permanently or temporarily stored in the memory or memories of the processor. The set of instructions may include various instructions that perform a particular task or tasks, such as those tasks described above. Such a set of instructions for performing a particular task may be characterized as a program, software program, software application, app, or software.

It is appreciated that in order to practice the methods of the embodiments as described above, it is not necessary that the processors and/or the memories be physically located in the same geographical place. That is, each of the processors and the memories used in exemplary embodiments of the invention may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two or more pieces of equipment in two or more different physical locations. The two distinct pieces of equipment may be connected in any suitable manner. Additionally, the memory may include two or more portions of memory in two or more physical locations.

Data and information maintained by the servers may be stored and cataloged in one or more databases, which may comprise or interface with a searchable database and/or a cloud database. The databases may comprise, include or interface to a relational database. Other databases, such as a query format database, a Standard Query Language (SQL) format database, a storage area network (SAN), or another similar data storage device, query format, platform or resource may be used. The databases may comprise a single database or a collection of databases. In some embodiments, the databases may comprise a file management system, program or application for storing and maintaining data and information used or generated by the various features and functions of the systems and methods described herein.

As described above, a set of instructions is used in the processing of various embodiments of the invention. FIGS. 2-5 may include software or computer programs stored in the memory (e.g., non-transitory computer readable medium containing program code instructions executed by the processor) for executing the methods described herein. The set of instructions may be in the form of a program or software or app. The software may be in the form of system software or application software, for example. The software might also be in the form of a collection of separate programs, a program module within a larger program, or a portion of a program module, for example. The software used might also include modular programming in the form of object oriented programming. The software tells the processor what to do with the data being processed.

Further, it is appreciated that the instructions or set of instructions used in the implementation and operation of the invention may be in a suitable form such that the processor may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processor, i.e., to a particular type of computer, for example. Any suitable programming language may be used in accordance with the various embodiments of the invention. For example, the programming language used may include assembly language, Ada, APL, Basic, C, C++, COBOL, dBase, Forth, Fortran, Java, Modula-2, Pascal, Prolog, REXX, Visual Basic, and/or JavaScript. Further, it is not necessary that a single type of instructions or single programming language be utilized in conjunction with the operation of the system and method of the invention. Rather, any number of different programming languages may be utilized as is necessary or desirable.

Also, the instructions and/or data used in the practice of various embodiments of the invention may utilize any compression or encryption technique or algorithm, as may be desired. An encryption module might be used to encrypt data. Further, files or other data may be decrypted using a suitable decryption module, for example.

In the system and method of exemplary embodiments of the invention, a variety of "user interfaces" may be utilized to allow a user to interface with the mobile devices or other personal computing device. As used herein, a user interface may include any hardware, software, or combination of hardware and software used by the processor that allows a user to interact with the processor of the communication device. A user interface may be in the form of a dialogue screen provided by an app, for example. A user interface may also include any of touch screen, keyboard, voice reader, voice recognizer, dialogue screen, menu box, list, checkbox, toggle switch, a pushbutton, a virtual environment (e.g., Virtual Machine (VM)/cloud), or any other device that allows a user to receive information regarding the operation of the processor as it processes a set of instructions and/or provide the processor with information. Accordingly, the user interface may be any system that provides communication between a user and a processor. The information provided by the user to the processor through the user interface may be in the form of a command, a selection of data, or some other input, for example.

The software, hardware and services described herein may be provided utilizing one or more cloud service models, such as Software-as-a-Service (SaaS), Platform-as-a-Service (PaaS), and Infrastructure-as-a-Service (IaaS), and/or using one or more deployment models such as public cloud, private cloud, hybrid cloud, and/or community cloud models.

Although the embodiments of the present invention have been described herein in the context of a particular implementation in a particular environment for a particular purpose, those skilled in the art will recognize that its usefulness is not limited thereto and that the embodiments of the present invention can be beneficially implemented in other related environments for similar purposes.

What is claimed is:

1. A system for implementing a cloud machine learning environment, the system comprising:
 a data source interface that communicates with a plurality of data sources;
 a discovery portal interface that communicates with a user via a network communication; and
 a processor coupled to the data source interface and the discovery portal interface, the processor configured to perform the steps of:
 receiving, via the discovery portal interface, a user request that identifies a data set;
 accessing the data set from one or more internal data sources;
 creating a machine learning instance in a cloud services platform;
 transferring the data set from the one or more internal data sources to a cloud data storage associated with the cloud services platform;
 cleansing the data set based on one or more classification rules; and
 applying machine learning analytics to the transferred dataset in the cloud data storage.

2. The system of claim 1, wherein the one or more internal data sources comprise Unified Data Services (UDS) data and user provided data (UPD).

3. The system of claim 1, wherein the cloud data storage comprises one or more sandboxes.

4. The system of claim 3, wherein the one or more sandboxes comprise folders, user groups and encryption keys.

5. The system of claim 1, wherein the cloud data storage comprises a distributed file system.

6. The system of claim 1, wherein the classification rules comprise one-way has encryption.

7. The system of claim 1, wherein the classification rules comprise two way keyed encryption.

8. The system of claim 1, wherein the classification rules comprise highly confidential, confidential and internal.

9. The system of claim 1, wherein the classification rules comprise protection group classifications.

10. The system of claim 1, wherein the cloud services platform comprises identify and access management services, key management services and data and access monitoring services.

11. A method for implementing a cloud machine learning environment, the method comprising the steps of:
   receiving, via a discovery portal interface, a user request that identifies a data set;
   accessing the data set from one or more internal data sources;
   creating, via a computer processor, a machine learning instance in a cloud services platform;
   transferring, via a communication channel, the data set from the one or more internal data sources to a cloud data storage associated with the cloud services platform;
   cleansing the data set based on one or more classification rules; and
   applying machine learning analytics to the transferred dataset in the cloud data storage.

12. The method of claim 11, wherein the one or more internal data sources comprise Unified Data Services (UDS) data and user provided data (UPD).

13. The method of claim 11, wherein the cloud data storage comprises one or more sandboxes.

14. The method of claim 13, wherein the one or more sandboxes comprise folders, user groups and encryption keys.

15. The method of claim 11, wherein the cloud data storage comprises a distributed file system.

16. The method of claim 11, wherein the classification rules comprise one-way has encryption.

17. The method of claim 11, wherein the classification rules comprise two way keyed encryption.

18. The method of claim 11, wherein the classification rules comprise highly confidential, confidential and internal.

19. The method of claim 11, wherein the classification rules comprise protection group classifications.

20. The method of claim 11, wherein the cloud services platform comprises identify and access management services, key management services and data and access monitoring services.

* * * * *